Patented June 16, 1931

1,810,222

UNITED STATES PATENT OFFICE

ROBERT C. PALMER, OF PENSACOLA, FLORIDA, ASSIGNOR TO THE NEWPORT COMPANY, OF CARROLLVILLE, WISCONSIN, A CORPORATION OF DELAWARE

PROCESS OF PURIFYING AND DECOLORIZING ROSIN

No Drawing.  Application filed September 19, 1927. Serial No. 220,646.

This invention relates to a process of purifying and decolorizing rosin containing material by the use of resorcinol and adsorptive materials and to the purified rosin obtained thereby.

It is an object of this invention to provide a method whereby an inferior grade of rosin may be purified in an economical and practical manner to produce as final products purified rosins up to and including the highest grades known to the trade as "WW" and "X" rosins.

In the co-pending application of Ivan Gubelmann and Clyde O. Henke, entitled "Process of purifying and decolorizing rosin with resorcinol", Serial No. 208,407, filed July 25, 1927, it has been shown that resorcinol has selective extractive properties towards some of the impurities and coloring matters contained in rosin, including both the gum and wood rosins. The present invention embodies certain improvements over the above process, as a result of which still higher grades of rosin can be obtained.

It has been found that in the treatment of rosin, in any of the usual rosin solvents, such as petroleum naphtha, gasoline and other aliphatic hydrocarbons, with resorcinol, there still remains some color in the rosin extract after limited treatment; whereas if this partially purified rosin be still further treated with an adsorptive material like fuller's earth, charcoal or the like, the last traces of color may be completely removed. After removal of the solvent there results a rosin product of exceptionally high quality corresponding to the standard of "WW" rosin or better.

I am fully aware that fuller's earth and the like have been previously proposed as a means of decolorizing rosin. In the use of the adsorptive materials alone, however, the removal of the coloring matter is a more tedious and impractical method for the reason that the adsorptive material becomes too easily saturated.

The principle of this invention resides in the method for the removal of the impurities by the combination of the two steps, namely the removal of the bulk of the impurities by means of the resorcinol, followed by a finishing process using adsorptive materials for the complete removal of the impurities and coloring matter.

The preferred method is briefly described in the following examples which are given to more clearly illustrate the invention:

Example I

To a solution of 2000 parts of rosin extract, as is commonly obtained in the production of wood rosin by the extraction of resinous woods with petroleum naphtha, are added 50 parts of resorcinol. The resulting mixture is well agitated and heated to the boiling point of the solvent. Without prolonged treatment, the mixture is then cooled to ordinary or low temperature, say 15° C. There results a solution of partially purified rosin and a precipitated mass containing the bulk of the impurities, from which the rosin solution may be easily decanted. The so-decanted solution contains in addition to the rosin a small amount of dissolved resorcinol, which is then extracted with water. The rosin extract, from which the resorcinol has been practically completely removed, is then slowly run through a purifying tower partially filled with 200 parts of fuller's earth, which has previously been dried to remove excess water. The extract after running through the tower is practically free of coloring matter and after removal of the solvent yields a rosin of a quality corresponding to "WW" rosin or better.

The extract remaining in the tower is flushed out (replaced) by fresh solvent.

The fuller's earth is preferably revivified by any suitable method and re-used in subsequent operations.

Example II

Method of procedure is the same as in Example #1 except that 300 parts of charcoal are used instead of the fuller's earth. The charcoal used is of the type adapted for the decolorizing of oils.

While in the above examples, a filtration step has been employed, I do not wish to limit my method to any particular manner of treating the rosin extract with the adsorptive material. My preferred method, for economic reasons, consists in causing the rosin extract to flow through a layer of the adsorptive material.

Likewise I do not wish to limit my process to the use of any definite rosin solvent, as it has been found that the usual rosin solvents disclosed above may be employed in a similar manner. It will be understood that either a rosin extract formed as a step in the usual extraction processes, or a redissolved rosin may be treated by my process. Furthermore I am aware that different proportions of the adsorbing material may be used and that temperatures differing from the preferred temperatures may be employed to bring about satisfactory results. I therefore do not purpose to limit the patent granted hereon other than as necessitated by the prior art.

I claim as my invention:

1. The process of improving the quality of rosin, which comprises partially purifying the rosin with resorcinol and subsequently treating the partially purified rosin with an adsorptive material to remove remaining impurities.

2. The process of improving the quality of rosin, which comprises treating a rosin extract with resorcinol to remove the bulk of the impurities, substantially freeing the rosin extract from the resorcinol and subsequently filtering the resulting rosin extract through fuller's earth to remove the remaining impurities.

3. The process of improving the quality of rosin, which comprises treating a solution of rosin in petroleum naphtha with resorcinol to remove the bulk of the impurities and coloring matters from the rosin, substantially freeing the rosin solution from the resorcinol and subsequently filtering the resulting rosin solution through fuller's earth to remove remaining impurities and coloring matters.

4. The process of improving the quality of rosin, which comprises treating a solution of rosin in petroleum naphtha with resorcinol to remove the bulk of the impurities and coloring matters from the rosin, substantially freeing the rosin solution from the resorcinol, subsequently filtering the resulting rosin solution through fuller's earth to remove remaining impurities and coloring matters, evaporating the solvent from the solution of the purified rosin and recovering the purified rosin.

5. As new articles of manufacture, wood rosins corresponding in color to "WW" rosin or better, and substantially identical with wood rosin obtainable by treating a rosin extract with resorcinol to remove the bulk of the impurities, freeing the rosin extract from the resorcinol, and filtering the resulting rosin extract through fuller's earth.

6. As a new article of manufacture, wood rosin corresponding in color to "X" standard, and substantially identical with wood rosin obtainable by treating a rosin extract with resorcinol to remove the bulk of the impurities, freeing the rosin extract from the resorcinol and filtering the resulting rosin extract through fuller's earth.

In testimony whereof I have hereunto subscribed my name.

ROBERT C. PALMER.